(12) United States Patent
Bowles

(10) Patent No.: US 7,967,359 B2
(45) Date of Patent: Jun. 28, 2011

(54) SYSTEM, METHOD AND APPARATUS FOR DEFLECTING MUD FROM THE FOOT AREA OF AN ALL TERRAIN VEHICLE

(76) Inventor: Wayne A. Bowles, West Haven, UT (US)

( * ) Notice: Subject to any disclaimer, the term of this patent is extended or adjusted under 35 U.S.C. 154(b) by 204 days.

(21) Appl. No.: 12/027,745

(22) Filed: Feb. 7, 2008

(65) Prior Publication Data

US 2008/0185864 A1 Aug. 7, 2008

Related U.S. Application Data

(60) Provisional application No. 60/888,731, filed on Feb. 7, 2007.

(51) Int. Cl.
*B62D 25/16* (2006.01)
(52) U.S. Cl. ...... 296/77.1; 296/1.04; 296/198; 280/847; 280/851
(58) Field of Classification Search ............ 296/198, 296/1.04, 781, 81, 82, 83, 77.1, 78.1; 280/748, 280/847, 152.1, 152.2, 762, 152.3, 848, 851, 280/852
See application file for complete search history.

(56) References Cited

U.S. PATENT DOCUMENTS

| | | | | |
|---|---|---|---|---|
| 4,724,585 A | * | 2/1988 | Whitman | 24/195 |
| 4,973,082 A | * | 11/1990 | Kincheloe | 280/756 |
| 5,062,675 A | * | 11/1991 | Rhoden et al. | 280/748 |
| 5,203,601 A | * | 4/1993 | Guillot | 296/77.1 |
| 5,794,976 A | * | 8/1998 | Stevicks | 280/770 |
| 5,967,553 A | * | 10/1999 | Cominsky | 280/847 |
| 6,206,446 B1 | * | 3/2001 | Slayden | 296/77.1 |
| 6,270,106 B1 | * | 8/2001 | Maki et al. | 280/291 |
| 6,543,830 B1 | * | 4/2003 | Stuck | 296/77.1 |
| 6,565,139 B2 | * | 5/2003 | Bayerle et al. | 296/77.1 |
| 6,932,411 B2 | * | 8/2005 | McKinney | 296/81 |
| 7,044,527 B2 | * | 5/2006 | Maeda et al. | 296/37.1 |
| 7,503,607 B2 | * | 3/2009 | Sersland et al. | 296/26.09 |
| 2008/0276443 A1 | * | 11/2008 | Hampel | 29/469 |
| 2009/0267335 A1 | * | 10/2009 | Johnson et al. | 280/756 |

* cited by examiner

*Primary Examiner* — Jason S Morrow
(74) *Attorney, Agent, or Firm* — Kunzler Needham Massey & Thorpe

(57) ABSTRACT

An apparatus, system, and method for deflecting mud from the foot area of an all terrain vehicle includes a substantially vertical barrier disposed adjacent to the foot area of the all terrain vehicle. The apparatus comprises a mud deflector stretched between a front fender and a rear fender. The apparatus may comprises a mud deflector configured from an elastomeric material stretched between a front fender and a rear fender and attached to the front and rear fenders by a plurality of attachment clips. In certain embodiments the apparatus may comprise a mud deflector configured from a rigid material attached to the front and rear fenders of the all terrain vehicle.

19 Claims, 5 Drawing Sheets

SYSTEM, METHOD AND APPARATUS FOR DEFLECTING MUD FROM THE FOOT AREA OF AN ALL TERRAIN VEHICLE

CROSS-REFERENCE TO RELATED APPLICATION

This application claims priority to U.S. Provisional Patent Application No. 60/888,731 entitled "ATV MUD DEFLECTOR DEVICE" and filed on Feb. 7, 2007 for Wayne A. Bowles, which is incorporated herein by reference in its entirety.

BACKGROUND OF THE INVENTION

1. Field of the Invention

This invention relates to a system, method and device for deflecting mud from an all terrain vehicle, and more particularly to a mud deflector for maintaining a clean and debris-free area around an all terrain vehicle foot platform.

2. Description of the Related Art

All Terrain Vehicles (ATV) comprise a number of small open motorized buggies and tricycles designed for off-road use. The operator or "rider" sits astride the vehicle on a seat, with his or her hands on a set of handlebars. The rider's feet are supported on a set of foot platforms or foot pegs which stick out from the frame of the ATV. Speed is controlled with a thumb lever or twist throttle disposed on the right side handlebar grip. Braking of the front tire or tires on an ATV is controlled by a hand-lever disposed on the right side of the handlebar grip. Braking of the rear tires of an ATV is controlled by a foot pedal disposed on the right side of the vehicle near the rider's foot. Gear control (shifting) is accomplished by a clutch, disengaged by compressing the left hand-lever, and moving the left foot-lever up and down. Steering is accomplished by application of pressure to one side or the other of the handlebars.

Certain ATV's comprise three wheels and are configured similar to a child's tricycle with one wheel in the front of the vehicle and two wheels in the back of the vehicle. Others, commonly referred to as a "four-wheeler," comprise four wheels as the name suggests. On a four-wheeler two front fenders are disposed around the front tires and two rear fenders are disposed around the rear tires. The fenders act to deflect mud and debris from the rider who is seated on a seat that spans the distance between the front tires and the rear tires.

A foot platform is disposed between the front fender and the rear fender and provides an ATV user a place to rest his or her feet while using the vehicle. The foot pedal for braking the vehicle is disposed above the foot platform at a distance high enough to allow perpendicular movement of the foot pedal. The clutch foot-lever for shifting the vehicle is similarly disposed above a foot platform with enough clearance to allow perpendicular movement of the foot-lever to shift the vehicle.

ATV's are used in a variety of terrain conditions ranging from paved roads to stream or river crossings. Often, ATV's are used in muddy or wet conditions such as when the rider is using the vehicle to hunt. As the rider uses the vehicle, mud, dust and debris collects on the foot platform. This may cause a potentially dangerous condition where the mud and debris builds up between the braking foot pedal or clutch lever and the foot platform. Similarly, as the rider uses the vehicle at high speeds rocks and other debris may be thrown from the tires into the rider's legs and feet.

From the foregoing discussion, it is apparent that a need exists for a safe, effective, quick release mud deflector that deflects mud and debris from around the foot platform of an ATV. Beneficially, such an apparatus should be designed to be easily adjusted and used with a standard ATV. The apparatus should be easily and efficiently manufactured of durable and reliable material at a cost consumers can afford.

SUMMARY OF THE INVENTION

The present invention has been developed in response to the present state of the art, and in particular, in response to the problems and needs in the art that have not yet been fully solved by currently available mud deflectors. Accordingly, the present invention has been developed to provide an apparatus, system, and method for deflecting mud from an ATV foot platform that overcomes many or all shortcomings in the art.

In one aspect of the invention, an apparatus for deflecting debris from an outdoor recreational vehicle includes a substantially vertical first protective membrane connected to an outdoor recreation vehicle. The first protective membrane is disposed adjacent to and above a first foot area and is configured to shield the first foot area.

In certain embodiments the first protective membrane comprises an elastomeric material. In one embodiment the first protective membrane comprises at least one elastic panel and at least one inelastic panel. In certain embodiments the first protective membrane comprises an inelastic fabric. In one embodiment the first protective membrane comprises a rigid panel.

In one embodiment of the invention the out door recreational vehicle comprises an all terrain vehicle. In certain embodiments of the present invention, the first protective membrane is connected to a first front fender and a first rear fender. In one embodiment the first protective membrane is connected to the first foot area.

In one aspect of the invention a plurality of attachment clips connect a first protective membrane to a first front fender, a first rear fender and a first foot area. In certain embodiments a single continuous attachment clip is disposed about the periphery of the first protective membrane, the single continuous attachment clip connects the first protective membrane to the first front fender, the first rear fender and the first foot area. In one embodiment the first protective membrane, the first front fender, the first rear fender and the first foot area are integrally connected to one and other.

In one aspect of the invention an apparatus for protecting an all terrain vehicle user's legs and feet includes a vertical barrier connected to an all terrain vehicle, the vertical barrier is disposed about the user's foot. In certain embodiments the vertical barrier is connected to a foot peg. In one embodiment the vertical barrier is connected to a foot platform.

In a further aspect of the invention, a means for protecting an all terrain vehicle user's legs and feet includes a means for deflecting debris from between a front fender and a rear fender and a means for attaching the deflecting means to the front fender and rear fender.

In one aspect of the present invention a system for deflecting mud and debris from a four wheel all terrain vehicle includes a first protective membrane disposed substantially above a first foot platform and between a first front fender and a first rear fender. The first protective membrane is configured to shield the first foot platform. A first plurality of clips is connected to the periphery of the first protective membrane. The first plurality of clips is configured to provide an attachment to connect the first protective membrane to the first front fender and the first rear fender. A second protective membrane is disposed substantially above a second foot platform and between a second front fender and a second rear fender. The second protective membrane is configured to shield the second foot platform. A second plurality of clips is connected to the periphery of the second protective membrane. The second plurality of clips is configured to provide an attachment to connect the second protective membrane to the second front fender and the second rear fender.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in FIGS. 1 through 5, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

Figure 1A:
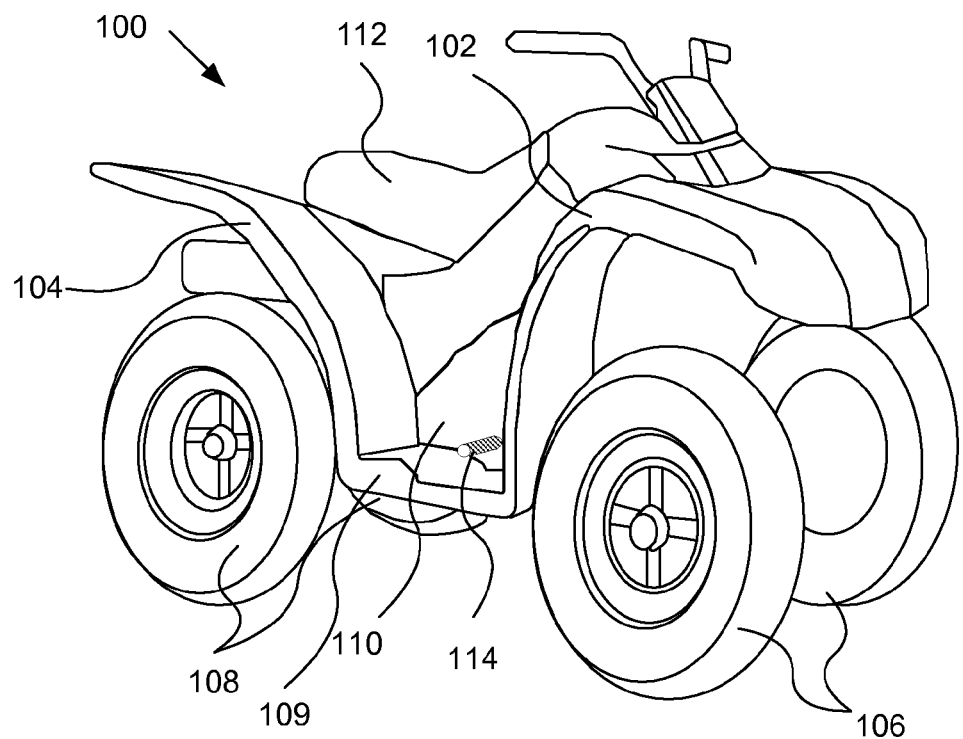
FIG. 1a is a perspective view illustrating one embodiment of the right side of an ATV according to the present invention.

FIG. 1a illustrates the right side of an all terrain vehicle 100 upon which the current invention may be affixed. The all terrain vehicle 100 comprises a front fender 102 surrounding a front tires 106 and a rear fender 104 surrounding a rear tires 108. In the illustrated embodiment, the front fender 102 and rear fender 104 are connected by a foot platform 109. Thus, an all terrain vehicle user's foot area 110 is defined by the front fender 102, the foot platform 109 and the rear fender 104. It should be understood however, that in certain embodiments the front fender 102 and the rear fender 104 may not be connected to each other by the foot platform 109. In embodiments where the front fender 102 and rear fender 104 are not connected by a foot platform 109, a foot peg (not shown) may be disposed between the front fender 102 and the rear fender 104 to allow the user, seated on seat 112, a place to rest his or her feet when using the all terrain vehicle 100.

Figure 1B:
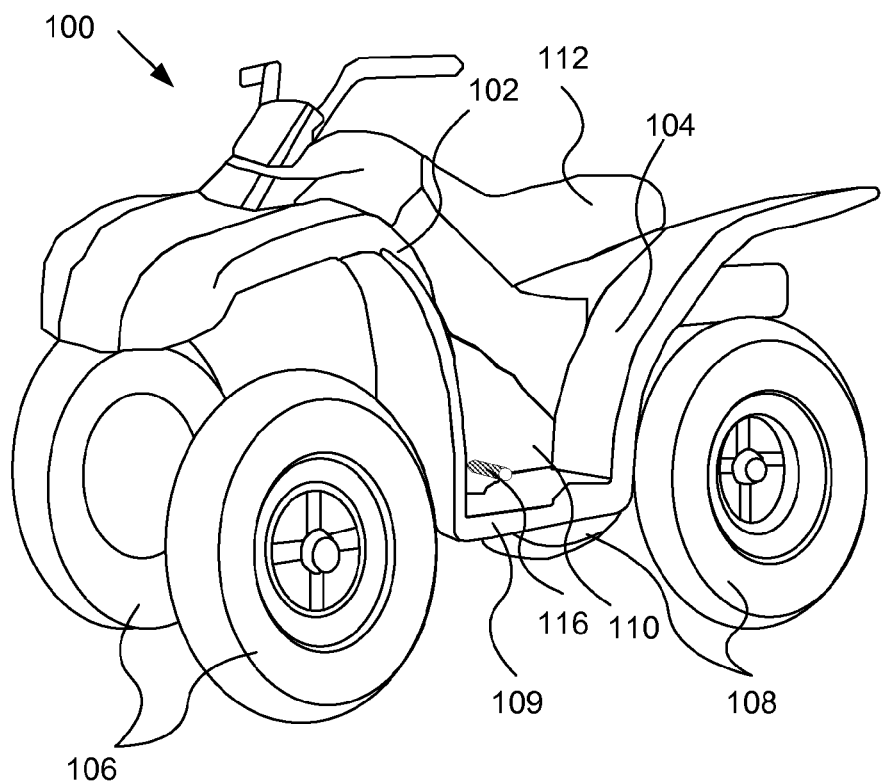
FIG. 1b is a perspective view illustrating one embodiment of the left side of an ATV according to the present invention.

A brake lever 114 for stopping the all terrain vehicle 100 is disposed within the foot area 110 on the right side of the all terrain vehicle 100 as illustrated in FIG. 1a. A shift lever 116 for changing gears on the all terrain vehicle 100 is disposed within the foot area 110 on the left side of the all terrain vehicle 100 as illustrated in FIG. 1b.

In use, dust, mud and debris is spun off of the front tires 106 and rear tires 108 into the foot area 110. Overtime the dust, mud and debris spun from the front tire 106 and rear tire 108 collects on the foot platform 109. The dust, mud and debris can interfere with the brake lever 114 and the shift lever 116 making shifting and braking the all terrain vehicle 100 difficult and dangerous.

Figure 2A:
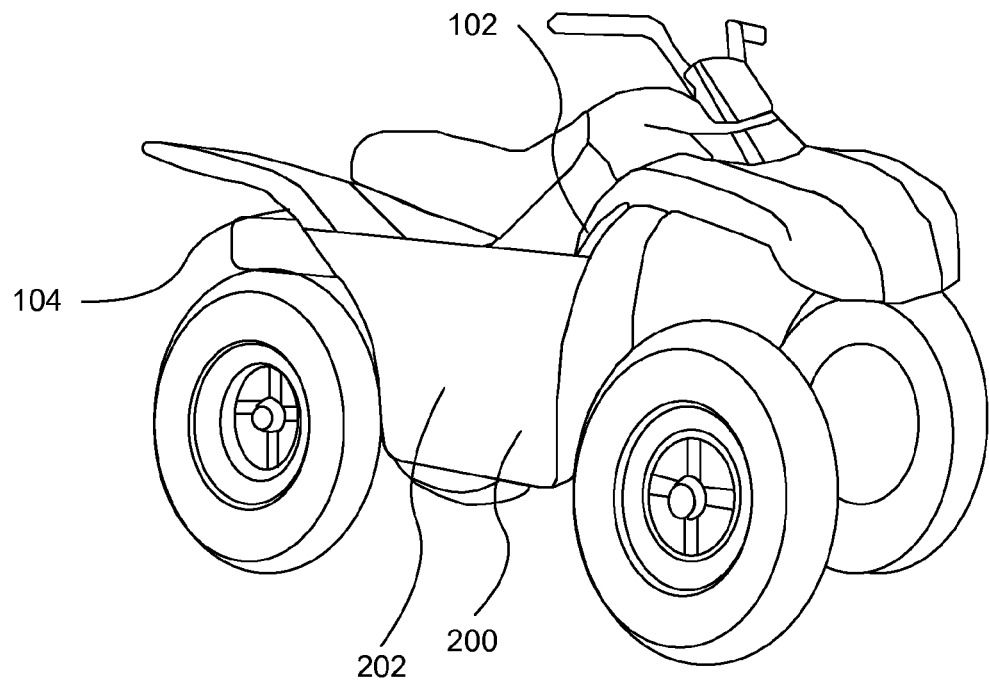
FIG. 2a is a perspective view illustrating one embodiment of an ATV mud deflecting apparatus attached to an ATV according to the present invention.

FIG. 2a illustrates a mud deflector 200 disposed adjacent to and above the foot area 110 according to one embodiment of the current invention. The mud deflector is substantially vertical to shield the foot area 110. In certain embodiments the mud deflector 200 may be permanently attached or integral with the front fender 102 and the rear fender 104 such that the front fender 102, the rear fender 104 and the mud deflector 200 comprise a single piece of material. In certain embodiments, the foot platform 109 may similarly be integral with the mud deflector 200 and comprise a single piece of material. In certain embodiments the mud deflector 200 may be removeably attached to the front fender 102, the rear fender 104 and the foot platform 109 by snaps, Velcro, buttons, clips, or other attachment means as is known in the art. In one embodiment the mud deflector 200 may be connected to only the front fender 102, the rear fender 104 but not the foot platform. In certain embodiments the mud deflector 200 may be disposed above the plane of the foot platform 109 such that there is a gap between the foot platform 109 and the mud deflector 200. In one embodiment the mud deflector 200 may be connected to the foot platform 109 but not the front fender 102 or the rear fender 104. In yet another embodiment the mud deflector 200 may be connected to front fender 102 and the foot platform 109 but not the rear fender 104. In other embodiments the mud deflector may be connected to the rear fender 104 and the foot platform 109 but not the front fender 102.

In one embodiment, the mud deflector 200 may comprise a solid, rigid material such as plastic or metal. In certain embodiments the mud deflector 200 may comprise a pliable material such as cloth, flexible plastic or rubber material which may be stretched between the front fender 102 and the rear fender 104. Where the mud deflector 200 is pliable, the front fender 102, rear fender 104 and foot platform 109 may provide a rigid support structure to define the shape of the mud deflector 200. When a pliable mud deflector 200 is removed from the all terrain vehicle 100, the mud deflector 200 can be folded into a compact unit for storage or transportation. In one embodiment a single size elastic mud deflector 200 stretches to accommodate various sizes and configurations of all terrain vehicles 100. In certain embodiments the mud deflector 200 may be configured to custom fit each specific individual model and make of all terrain vehicles 100. Of course in certain embodiments the mud deflector 200 may be configured to fit a range of models and makes of all terrain vehicles.

Figure 2B:
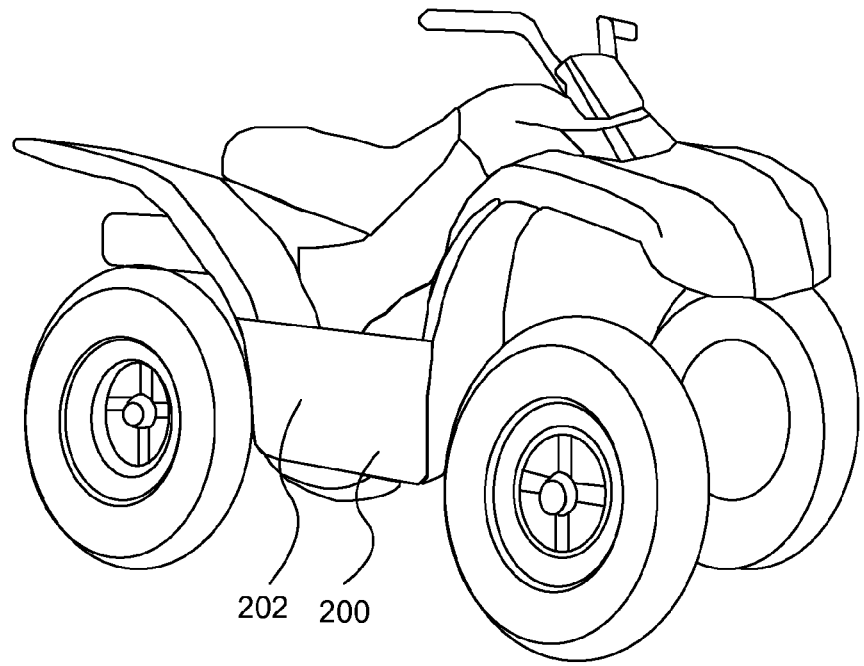
FIG. 2b is a perspective view illustrating one embodiment of an ATV mud deflecting apparatus attached to an ATV according to the present invention.

When attached to an all terrain vehicle 100, the mud deflector 200 provides a substantially vertical barrier to keep mud and debris out of the foot region while the user is driving the all terrain vehicle 100. In certain embodiments the mud deflector 200 may be configured to protect the leg of the all terrain vehicle user from the foot to the knee as illustrated in FIG. 2a. In another embodiment the mud deflector 200 may be configured to protect the lower portion of the leg such as the foot to the calf of the user as illustrated in FIG. 2b. In one embodiment, not illustrated, the mud deflector 200 may be lifted off of the foot platform 109 and configured to protect the lower leg and knee of the user while leaving the foot unprotected. One skilled in the art will recognize that additional sizes of mud deflector 200 may be constructed to provide varying degrees of protection.

In certain embodiments the mud deflector 200 has a front side 202 upon which all terrain vehicle manufactures or other interested organizations or individuals may imprint logos or other marketing material. In one embodiment aesthetically pleasing illustrations may be imprinted on the front side 202 of the mud deflector 200. In certain embodiments, the front side 202 of the mud deflector 200 may be imprinted with a camouflage pattern for hunting purposes. Warning labels or instructions for using the mud deflector 200 may be imprinted on the back side of the mud deflector 200.

Figure 3A:
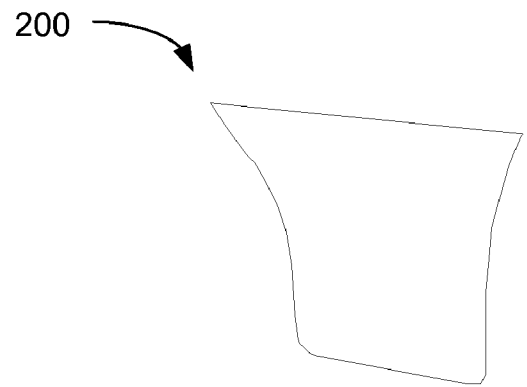
FIG. 3a is a perspective view illustrating a mud deflector according to one embodiment of the present invention.
Figure 3B:
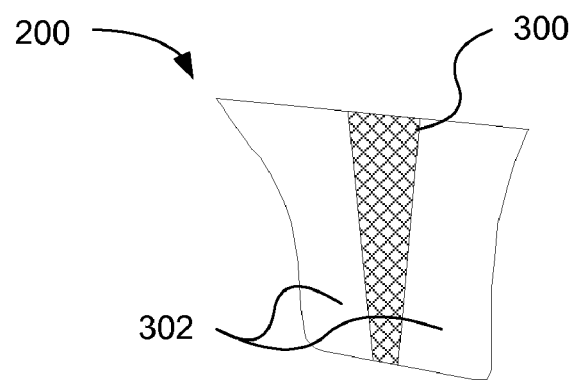
FIG. 3b is a perspective view illustrating a mud deflector with an elastic portion according to the one embodiment of the present invention.
Figure 3C:
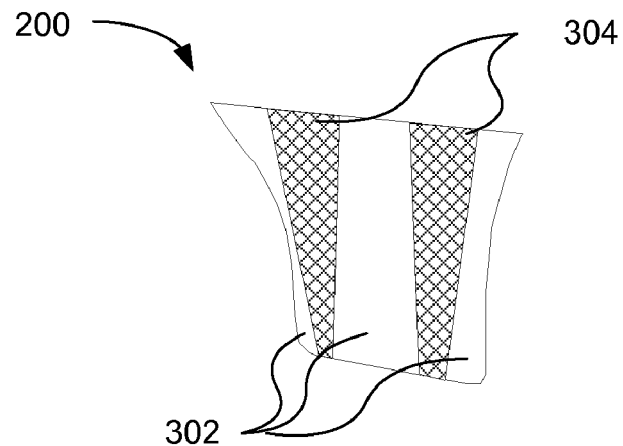
FIG. 3c is a perspective view illustrating a mud deflector with a plurality of elastic portions according to one embodiment of the present invention.

FIGS. 3a through 3c illustrate some embodiments of a rigid mud deflector 200 of the current invention. As stated above, in certain embodiments the mud deflector 200 may comprise a solid piece of rigid material such as a plastic or metal as illustrated in FIG. 3a. In one embodiment, such as the embodiment illustrated in FIG. 3b, an elastic material 300 may be coupled to rigid pieces 302 to allow the rigid mud deflector 200 to stretch between the front fender 102 and rear fender 104. In certain embodiments, such as the embodiment illustrated in FIG. 3c, a plurality of elastic portions 304 may be coupled to rigid pieces 302. Thus, where a rigid mud deflector 200 is preferred, elastic material 300 or elastic portions 304 may allow a universal fit between different makes and models of all terrain vehicles 100.

Figure 4A:
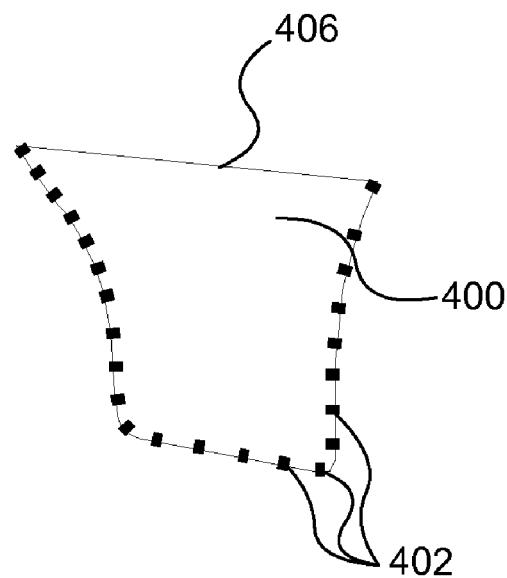
FIG. 4a is a perspective view illustrating the back side of a mud deflector according to one embodiment of the present invention.
Figure 4B:
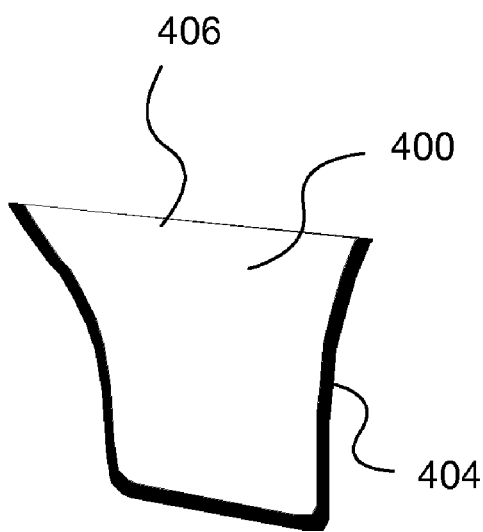
FIG. 4b is a perspective view illustrating the back side of a mud deflector according to another embodiment of the present invention.

FIG. 4a illustrates the back side 400 of the mud deflector 200 according to one embodiment of the current invention. In certain embodiments a plurality of attachments 402 may be disposed about the periphery of the mud deflector 200. In certain embodiments the attachments 402 are affixed to the mud deflector 200 and provide a means of connecting the mud deflector 200 to the all terrain vehicle 100. In certain embodiments a single attachment 404 may encompass the periphery of the back side 400 of the mud deflector 200 as illustrated in FIG. 4b. In one embodiment the top 406 of mud deflector 200 is free of attachments 402 or attachment 404 so that the top 406 of the mud deflector 200 remains open or unattached to the all terrain vehicle 100 to allow the all terrain vehicle user's foot to access the foot area 110.

The attachments 402 or attachment 404 may comprise a snap, button, Velcro, retaining clip 500 (as discussed below in reference to FIG. 5) or other attachment means as is known in the art. In certain embodiments the attachments 402 or attachment 404 may be configure to maintain the mud deflector 200 on the all terrain vehicle 100 when pressure from rocks, mud, or debris is applied to the front side 202 of the mud deflector 200. The attachments 402 or attachment 404 may be further configured to quickly and easily release from the all terrain vehicle 100 when pressure is applied to the back side 400 of the mud deflector 200. This quick release function allows an all terrain vehicle user to quickly and easily remove his or her leg from the foot area 110 when necessary for safety purposes.

Figure 5:
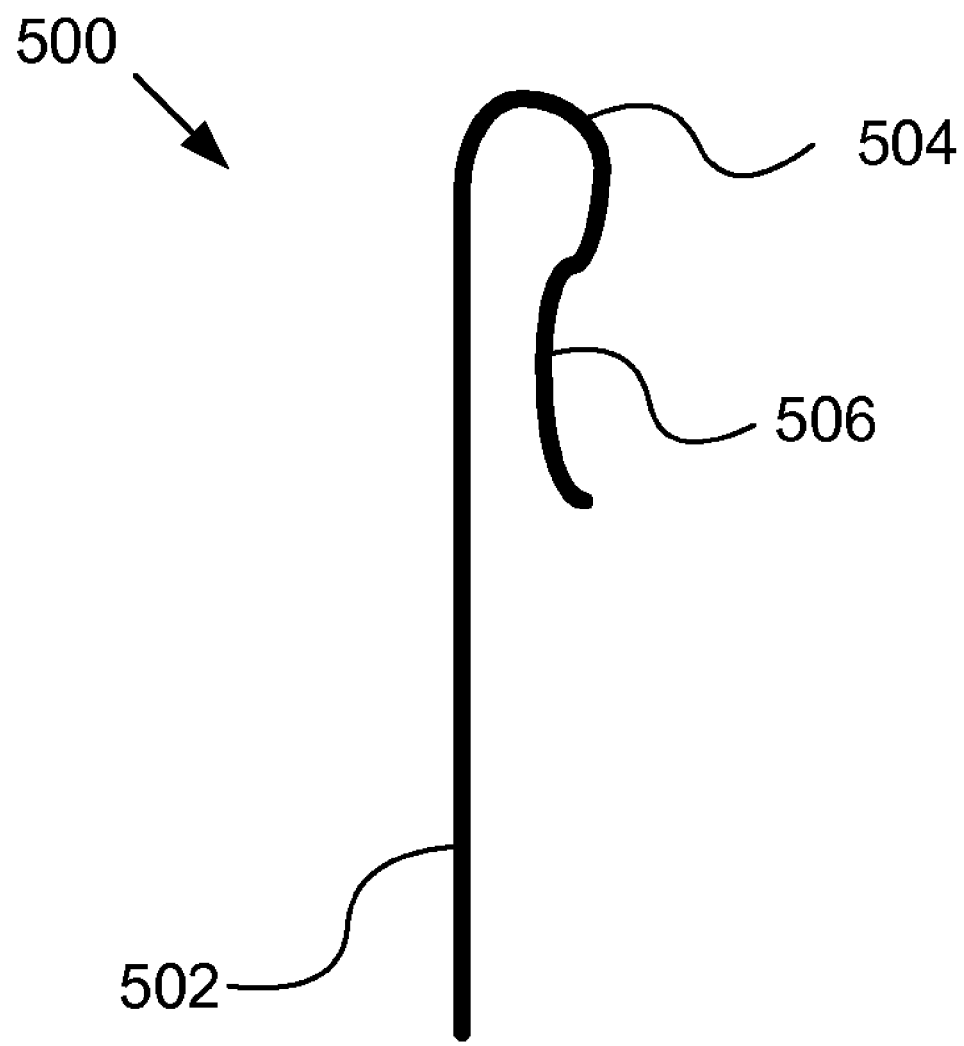
FIG. 5 is an elevated view of a retaining clip according to one embodiment of the current invention.

FIG. 5 illustrates one embodiment of a retaining clip 500 according to the present invention. The retaining clip 500 comprises a first surface 502 for fastening the retaining clip 500 to the mud deflector 200 and a second surface 506 for pinching the edge of the front fender 102, the foot platform 109 and the rear fender 104. The first surface 502 is disposed parallel to the second surface 506 and is connected by a 180 degree arch 504. The first surface 502 is longer than the second surface 506 to allow attachment of the first surface 502 to the mud deflector 200. In certain embodiments the first surface 502 of the retaining clip 500 may be sewn onto the mud deflector 200. In other embodiments the first surface 502 of the retaining clip 500 may be glued or thermally welded to the mud deflector 200. In certain embodiments the retaining clip 500 and the mud deflector 200 may be molded from the same mold such that they are one piece. In certain embodiments the retaining clip 500 comprises a rigid material such as a plastic or metal. The retaining clip 500 is configured to maintain its original shape to pinch the edge of the front fender 102, the foot platform 109 and the rear fender 104. As discussed above, multiple retaining clips 500 may be attached to each of attachments 402 or a single retaining clip may be attached about the periphery of the mud deflector at attachment 404. One skilled in the art will recognize that alternative quick release attachment means which allow a user to quickly remove his foot from the foot area 110 are within the scope of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for deflecting debris from an outdoor recreational vehicle, the apparatus comprising:
 a substantially vertical protective barrier positionable between a front fender and a rear fender of an outdoor recreation vehicle, the protective barrier disposed adjacent to and at or above a foot area on the outdoor recreational vehicle and at or below a top of the front fender and a top of the rear fender;
 wherein the protective barrier is positioned between the front fender and the rear fender to shield the foot area from debris;
 at least one attachment coupled to the protective barrier, the at least one attachment configured to removably couple the protective barrier to at least one of the front fender and the rear fender; and
 wherein the at least one attachment maintains the coupling between the protective barrier and at least one of the front fender and the rear fender when a pressure is applied by debris against an outer surface of the protective barrier during operation of the outdoor recreation vehicle, and wherein the at least one attachment is quickly and easily uncoupled from at least one of the front fender and the rear fender in response to a pressure applied by a user to an inner surface of the protective barrier during operation of the outdoor recreation vehicle, the inner surface of the protective barrier comprising a surface closest to the outdoor recreation vehicle, the outer surface of the protective barrier comprising a surface opposite the inner surface.

2. The apparatus of claim 1, wherein the at least one attachment comprises at least one attachment clip that couples the protective barrier to at least one of the front fender and the rear fender, wherein the at least one attachment clip is uncoupled from at least one of the front fender and the rear fender when pressure is applied to the inner surface of the protective barrier.

3. The apparatus of claim 1, wherein the protective barrier comprises an elastic panel and a substantially rigid panel.

4. The apparatus of claim 1, wherein the protective barrier comprises an inelastic fabric.

5. The apparatus of claim 1, wherein the protective barrier comprises a rigid panel.

6. The apparatus of claim 1, wherein at least a portion of the protective barrier comprises an elastic material that stretches to fit a range of models of outdoor recreation vehicles.

7. The apparatus of claim 1, wherein the protective barrier remains coupled to at least one of the front fender and the rear fender when pressure is applied to the outer surface of the protective barrier by debris such that the protective barrier is releasable in an outward direction and remains coupled to at least one of the front fender and the rear fender when pressure is applied in an inward direction.

8. The apparatus of claim 1, wherein the protective barrier is coupled to the foot area.

9. The apparatus of claim 1, further comprising a plurality of attachment clips coupling the protective barrier to one or more of the front fender, the rear fender, and the foot area.

10. The apparatus of claim 1, further comprising a single continuous attachment clip disposed about the periphery of the protective barrier, wherein the single continuous attachment clip couples the protective barrier to one or more of the front fender, the rear fender, and the foot area.

11. The apparatus of claim 1, wherein the protective barrier is integrally coupled to one or more of the front fender, the rear fender, and the foot area such that the protective barrier remains coupled to one or more of the front fender, the rear fender, and the foot area when pressure is applied to the inner surface of the protective barrier.

12. The apparatus of claim 1, wherein at least one of a size of the protective barrier and a coupling between the protective barrier and at least one of the front fender, the rear fender, and the foot area is adjustable to fit a range of models of outdoor recreation vehicles.

13. The apparatus of claim 1, wherein uncoupling of the at least one attachment allows lateral removal of at least one of a user's foot and a user's leg through a position occupied by the protective barrier when the protective barrier is coupled to at least one of the front fender and the rear fender.

14. The apparatus of claim 1, wherein the protective barrier comprises a first protective barrier and further comprising a second protective barrier coupled to one or more of a second front fender, a second rear fender, and a second foot area.

15. An apparatus for protecting an all terrain vehicle user's legs and feet, the apparatus comprising;
 a substantially vertical protective barrier positionable between a front fender and a rear fender of an all terrain vehicle, the protective barrier disposed adjacent to and at or above a foot area on the all terrain vehicle and at or below a top of the front fender and a top of the rear fender;
 wherein the protective barrier is positioned between the front fender and the rear fender to shield the foot area from debris;
 at least one attachment coupled to the protective barrier, the at least one attachment configured to removably couple the protective barrier to at least one of the front fender and the rear fender;
 wherein the at least one attachment maintains the coupling between the protective barrier and at least one of the front fender and the rear fender when a pressure is applied by debris against an outer surface of the protective barrier during operation of the outdoor recreation vehicle, and wherein the at least one attachment is quickly and easily uncoupled from at least one of the front fender and the rear fender in response to a pressure applied by a user to an inner surface of the protective barrier during operation of the outdoor recreation vehicle, the inner surface of the protective barrier comprising a surface closest to the all terrain vehicle, the outer surface of the protective barrier comprising a surface opposite the inner surface; and
 wherein uncoupling of the at least one attachment allows lateral removal of at least one of a user's foot and a user's leg through a position occupied by the protective barrier when the protective barrier is coupled to at least one of the front fender and the rear fender.

16. The apparatus of claim 15, wherein the protective barrier is coupled to a foot peg of the all terrain vehicle.

17. The apparatus of claim 15, wherein the protective barrier is coupled to a foot platform of the all terrain vehicle.

18. An apparatus for protecting an all terrain vehicle user's legs and feet, the apparatus comprising:
 a substantially vertical protective barrier positionable between a front fender and a rear fender of an all terrain vehicle, the protective barrier disposed adjacent to and at or above a foot area on the all terrain vehicle and at or below a top of the front fender and a top of the rear fender;
 wherein the protective barrier is positioned between the front fender and the rear fender to shield the foot area from debris;

at least one attachment coupled to the protective barrier, the at least one attachment configured to removably couple the protective barrier to at least one of the front fender and the rear fender;

wherein the at least one attachment maintains the coupling between the protective barrier and at least one of the front fender and the rear fender when a pressure is applied by debris against an outer surface of the protective barrier during operation of the all terrain vehicle, and wherein the at least one attachment is quickly and easily uncoupled from at least one of the front fender and the rear fender in response to a pressure applied by a user to an inner surface of the protective barrier during operation of the all terrain vehicle, the inner surface of the protective barrier comprising a surface closest to the all terrain vehicle, the outer surface of the protective barrier comprising a surface opposite the inner surface; and wherein at least a portion of the protective barrier comprises an elastic material a substantially rigid panel, the elastic panel configured to stretch to fit a range of models of outdoor recreation vehicles.

19. A system for deflecting mud and debris from a four wheel all terrain vehicle, the system comprising:

a first protective barrier positionable between a first front fender and a first rear fender of an outdoor recreation vehicle, the first protective barrier disposed adjacent to and at or above a first foot platform on the all terrain vehicle and at or below a top of the first front fender and a top of the first rear fender;

wherein the first protective barrier is positioned between the first front fender and the first rear fender, the first protective membrane shielding the first foot platform;

a first attachment comprising at least one attachment coupled to the first protective barrier, the at least one attachment configured to removably couple the first protective barrier to at least one of the first front fender and the first rear fender;

wherein the at least one attachment of the first attachment maintains the coupling between the first protective barrier and at least one of the first front fender and the first rear fender when a pressure is applied by debris against an outer surface of the first protective barrier during operation of the all terrain vehicle, and wherein the at least one attachment of the first attachment is quickly and easily uncoupled from at least one of the first front fender and the first rear fender in response to a pressure applied to an inner surface of the first protective barrier during operation of the all terrain vehicle, the inner surface of the first protective barrier comprising a surface closest to the all terrain vehicle, the outer surface of the protective barrier comprising a surface opposite the inner surface;

a second protective barrier positioned between a second front fender and a second rear fender of the all terrain vehicle, the second protective barrier disposed adjacent to and at or above a second foot platform on the all terrain vehicle and at or below a top of the second front fender and a top of the second rear fender;

wherein the first protective barrier is positioned between the second front fender and the second rear fender, the second protective membrane shielding the second foot platform;

a second attachment comprising at least one attachment coupled to the second protective barrier, the at least one attachment of the second attachment configured removably couple the second protective barrier to at least one of the second front fender and the second rear fender; and wherein the at least one attachment of the second attachment maintains the coupling between the second protective barrier and at least one of the second front fender and the second rear fender when a pressure is applied by debris against an outer surface of the second protective barrier during operation of the outdoor recreation vehicle, and wherein the at least one attachment of the second attachment is quickly and easily uncoupled from at least one of the second front fender and the second rear fender in response to pressure applied by a user to an inner surface of the second protective barrier during operation of the all terrain vehicle, the inner surface of the second protective barrier comprising a surface closest to the all terrain vehicle, the outer surface of the second protective barrier comprising a surface opposite the inner surface.

* * * * *